(No Model.)
M. ANDERSON.
METHOD OF PRODUCING PHOTOGRAPHS IN COLORS.
No. 559,051.  Patented Apr. 28, 1896.
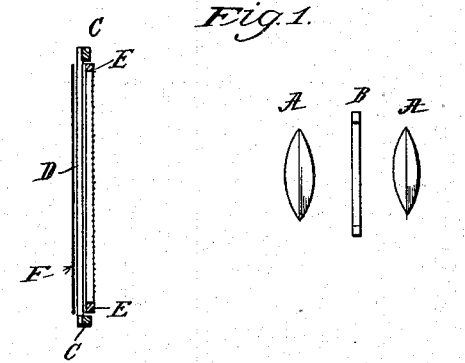
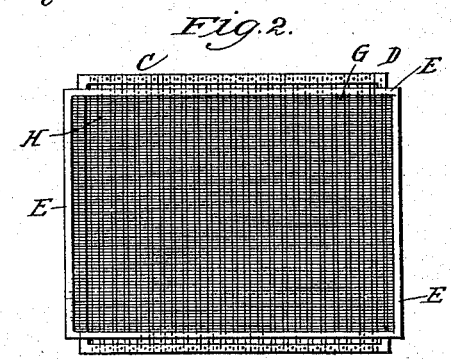
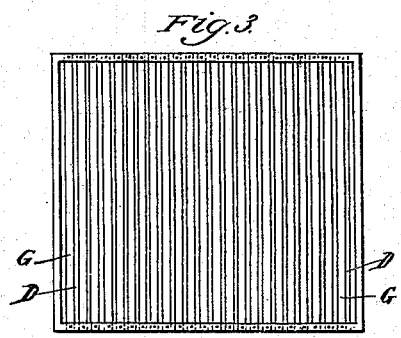
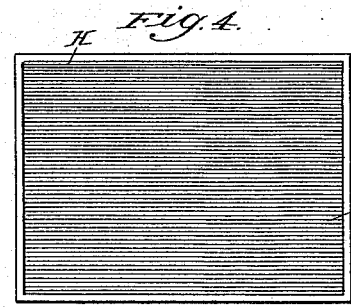
WITNESSES:
Edward C. Rowland
Etta Linton
INVENTOR
Macfarlane Anderson
BY Phillips Abbott
ATTORNEY

UNITED STATES PATENT OFFICE.

MACFARLANE ANDERSON, OF NORTHPORT, WASHINGTON.

METHOD OF PRODUCING PHOTOGRAPHS IN COLORS.

SPECIFICATION forming part of Letters Patent No. 559,051, dated April 28, 1896.

Application filed May 1, 1895. Serial No. 547,713. (No specimens.)

*To all whom it may concern:*

Be it known that I, MACFARLANE ANDERSON, a citizen of the United States, and a resident of Northport, in the county of Stevens and State of Washington, have invented certain new and useful Improvements in Methods of Producing Photographs in Colors, of which the following is a specification.

My invention, generally stated, relates to a method or process of producing photographs in colors; and it consists, essentially, in exposing to the action of light on any applicable photographic apparatus a sensitized surface, which may be of any suitable form, and at each exposure certain parts of the sensitized surface are protected against the action of light, while other parts are exposed, and at such exposure the rays of light are made to pass through a colored glass plate or equivalent device whereby the light-rays are cut off or absorbed, excepting those particularly desired to affect the sensitive surface at that exposure. In this way I procure upon the same sensitive plate or surface, by means of the successive exposures through differently-colored glass plates or the like and attendant protections, the desired color value for the reproduction of the color value in the subject.

Referring to the drawings accompanying this specification, Figure 1 illustrates a diagrammatical side view of the parts of a photographic apparatus, showing the features which are immediately connected with my invention. Fig. 2 illustrates a front view of the "color-value screen" and the "half-tone screen," both so called by me, superposed on each other. Fig. 3 illustrates a front view of the color-value screen separate by itself. Fig. 4 illustrates a front view of the half-tone screen separate by itself.

To construct these devices, wire or other suitable material is taken, which may be round, flat, or of any other cross-section and of aluminium, silver, or other suitable material, and stretched over or fastened to a light frame, preferably of metal. The wire is arranged in parallel lines, and clear spaces are left between the adjacent wires proportionate to one-half the thickness, or, as an equivalent, (or modified construction,) I take a glass plate and rule upon it opaque lines having the same relation to the clear spaces between them as the wires to the clear spaces above described. This device forms the "color-value screen," so called.

Referring to the drawings more specifically for a description in detail, A, Fig. 1, illustrates the lenses of the camera; B, Fig. 1, the colored plate or filter, which may be located, as shown, between the lenses or in any other suitable position.

C, Fig. 1, is the frame which supports the wires of the color-value screen. (It may be taken to represent the ruled glass plate, if such be used in the color-value screen.)

D, Fig. 1, illustrates the wires themselves; E, Fig. 1, the frame which supports the fine wires of the half-tone screen, and F, Fig. 1, the sensitive surface, which, as above stated, may be a coated-glass, celluloid, paper, or other support, either in sheet or roll form; G, Figs. 2 and 3, the spaces between the wires D; H, Fig. 4, the fine wires of the half-tone screen.

When paper or other material in the roll is used, the apparatus may be so arranged that it shall move behind the color-value screen, which will remain stationary instead of that screen moving in front of a fixed plate or other stationary support. In this case, if desired, the half-tone screen and the color-screen may be in one and the same structure. To produce negatives giving the true color values from any desired subject, I use this screen in front of an orthochromatic plate or other suitable sensitive surface. The first exposure may be made for the red values. The second exposure may be, say, for the green. In making this second exposure the wire or glass screen, as the case may be, is moved across the face of the sensitive plate to a sufficient extent to cover the parts previously exposed to the action of the light for the production of the red values, thus protecting those parts from further light action and exposing equal adjacent portions to the action of light for the green values. The third exposure for the blue color value is proceeded with in a similar manner, the screen moving across the sensitive film a like distance as in the two previous exposures and presenting the remaining unexposed parts of the sensitive surface to the action of the blue rays, the opaque lines or wires again protecting the parts previously exposed from further light action.

It is desirable that the movement of the screen should be secured by suitable and accurate mechanical devices. Coacting with the color-value screen in the reproduction of the true color value in each exposure I use suitable color-filters—that is to say, colored plates of glass, which cut off or absorb all light-rays excepting those particularly required to impress the sensitive plate. The movement of the screen across the face of the sensitive plate is of course made simultaneously with the change of the color-filters. Transparencies made from negatives obtained in this manner will give an exact color rendering of subjects photographed when said transparencies are placed upon paper ruled with alternate lines of the primary colors and registering with the same.

To apply this invention to the production of color-value negatives in cameras now in use with a roll of the sensitive film, the screen is permanently held in front of the film in the roll-holder or camera, and the sensitive film may be made to travel across and behind the same, the degree of movement in each exposure being regulated by any proper device.

To produce half-tone pictures, I place immediately in front of the color-value screen a frame having tightly stretched across it very fine wires, which are parallel with each other and so fine and close together that a stippled or half-tone effect will be produced. The wires in this half-tone frame should preferably lie at substantially right angles to those of the color-value screen, and the frame supporting them is stationary.

Should four or more exposures be desired or necessary, or if a less number than three be desired, then the color-value screen may be made in any other desired proportion of wire to the spaces between them or the opaque lines to the clear spaces in the glass screen, as the case may be; also, the wires or lines may run in any other preferred direction than that suggested above.

It will be observed that by my improvement such range of exposure can be given for the production of the several color values that I can get the full development of each color. This I deem important, because the exposures for a complete production of certain colors are necessarily much longer than that for other colors—as, for instance, red requires an exposure from fifty to one hundred times greater than blue; and the same fact, although in different degree, pertains to other colors.

Having described my invention, what I claim as new, and desire to secure by Letters Patent, is—

1. The method above described, consisting in successively exposing different portions of the same sensitive surface to the action of light, protecting the parts previously exposed, from the action of light, and interposing between the lens and the sensitive surface, at each exposure, a colored filter of the color desired at such exposure, for the purposes set forth.

2. The method above described, consisting in successively exposing different portions of the sensitive surface to the action of light, protecting the parts previously exposed from the action of light, continuously protecting the sensitive surface against the action of light in lines transverse to the portions which are exposed, and interposing between the lens and the sensitive surface, at each exposure, a colored filter of the color desired at such exposure, for the purposes set forth.

3. The method above described, consisting in interposing between the lens and the sensitive surface, a movable device adapted to protect successively certain portions of the sensitive surface, and to expose successively other portions of the sensitive surface, the protected parts being not less than the exposed parts, and said device being stationary during such exposure, for the purposes set forth.

Signed at Northport, in the county of Stevens and State of Washington, this 19th day of April, A. D. 1895.

MACFARLANE ANDERSON.

Witnesses:
M. F. HULL,
G. M. WELTY.